United States Patent
Cheung et al.

(10) Patent No.: US 11,550,551 B2
(45) Date of Patent: Jan. 10, 2023

(54) METHOD FOR ESTABLISHING SOCIAL NETWORK AND STORAGE MEDIUM THEREOF

(71) Applicant: ABLE WORLD INTERNATIONAL LIMITED, Virgin Islands (VG)

(72) Inventors: Wai-Tung Cheung, Hong Kong (HK); Chun-Hsiao Lin, New Taipei (TW); Shih-Cheng Lan, Taipei (TW); Ho-Cheung Cheung, Hong Kong (HK)

(73) Assignee: Able World International Limited, Tortola (VG)

( * ) Notice: Subject to any disclaimer, the term of this patent is extended or adjusted under 35 U.S.C. 154(b) by 495 days.

(21) Appl. No.: 15/319,066

(22) PCT Filed: Jun. 29, 2015

(86) PCT No.: PCT/CN2015/082687
§ 371 (c)(1),
(2) Date: Dec. 15, 2016

(87) PCT Pub. No.: WO2016/000593
PCT Pub. Date: Jan. 7, 2016

(65) Prior Publication Data
US 2017/0149726 A1 May 25, 2017

Related U.S. Application Data

(63) Continuation of application No. 14/577,772, filed on Dec. 19, 2014, now Pat. No. 9,626,157, and a (Continued)

(30) Foreign Application Priority Data

Jan. 4, 2015 (CN) .......................... 201510003852.0

(51) Int. Cl.
*H04L 51/52* (2022.01)
*G06F 8/35* (2018.01)
(Continued)

(52) U.S. Cl.
CPC .................. *G06F 8/35* (2013.01); *G06F 8/20* (2013.01); *G06F 8/30* (2013.01); *G06F 9/452* (2018.02);
(Continued)

(58) Field of Classification Search
CPC ................................ H04L 51/32; G06Q 50/01
(Continued)

(56) References Cited

U.S. PATENT DOCUMENTS

2008/0229215 A1* 9/2008 Baron ..................... G06N 3/006
715/751
2013/0132058 A1* 5/2013 Butler ..................... H04L 67/38
703/21

* cited by examiner

*Primary Examiner* — Glenford J Madamba
(74) *Attorney, Agent, or Firm* — Hamilton, Brook, Smith & Reynolds, P.C.

(57) ABSTRACT

A method for establishing a social network provides a user to prepare a deliverable work system and delivery the deliverable work system to other users to associate the deliverable work system. The delivering step may be repeatable by the user and the other users to establish a direct-link relationship of the deliverable work system and each of the other users, such that the user and the other users are able to work together in the deliverable work system. And a home system for hosting and managing the deliverable work system owned by the user may have a social network system with a associated second home system owned by any of the other users by the deliverable work system.

17 Claims, 12 Drawing Sheets

Related U.S. Application Data continuation of application No. 14/325,466, filed on Jul. 8, 2014, now Pat. No. 9,727,391, and a continuation of application No. 14/324,069, filed on Jul. 3, 2014, now Pat. No. 9,134,963.

(51) Int. Cl.
| | | |
|---|---|---|
| *G06F 8/20* | (2018.01) | |
| *G06F 9/451* | (2018.01) | |
| *G06F 8/30* | (2018.01) | |
| G06F 9/4401 | (2018.01) | |
| G06Q 50/00 | (2012.01) | |

(52) U.S. Cl.
CPC .............. *G06F 9/453* (2018.02); *H04L 51/52* (2022.05); *G06F 9/4411* (2013.01); *G06Q 50/01* (2013.01)

(58) Field of Classification Search
USPC ........................................................ 709/206
See application file for complete search history.

```
Using Work System;
Using Work System.Text;
Using Work System.Xml;
............
Namespace Work..........
{
    ............
    {
        "direct_link_rels" : [
            {"user_account" : "XXX............", "ip" : "............"},      ⎫
            {"user_account" : "YYY............", "............" : "............"},  ⎬ 231
            {"user_account" : "ZZZ............", "............" : "............"}   ⎭  233
        ]                                                                            235

"tools" : [
            {"name" : "messager", "type" : "app/chatting", "link" : "http://......"}  — 232
            {"name" : "dialer", "type" : "app/dialer", "link" : "ftp:............"}   — 234
            {"name" : "collector", "type" : "app/collector", "link" : "............"} — 236
        ]
    }
}
```
— 23

FIG.10

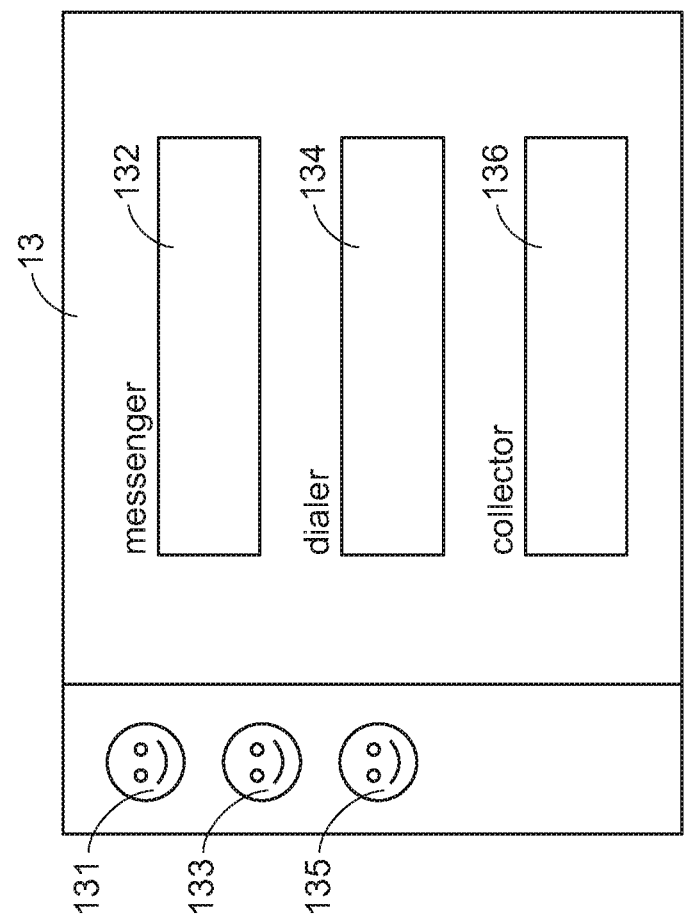

METHOD FOR ESTABLISHING SOCIAL NETWORK AND STORAGE MEDIUM THEREOF

TECHNICAL FIELD

This invention relates to the field of social network and, particularly to the field of creating and expanding of social network.

BACKGROUND

Recently, the rapid growth of social networking sites, such as MySpace® and Facebook®, has revealed a new trend of Internet usage. Social networking generally relates to services and tools that help users maintain and expand their circles of friends usually by exploiting existing relationships. Social networking sites have become the places on the Internet where many people spend most of their time, thus making these sites the main entry point for online activity. Often times, these social networking sites have become the focal point of sharing information, such as links, multimedia, music, and the like, too.

However, there are various types of limitation in these present social networks. For examples, it is necessary for users to register their accounts and log in for the purpose of sharing information under the most of the present social network service providers, and it is difficult for the users to communicate among the different social network service providers without registration or log-in. Next, for the users who have various accounts for different social groups, their sharing or acquiring information or messages might be distributed among the different server or cloud storages provided by the social network service providers for different social groups, which results in complicated management on their various assets. Even though the users might access those information or messages via single platform which provides an entry, however, they still install, register or log in the single platform. Furthermore, for sharing information or communicating among the users through single or one integrated platform, the shared, discussed, or communicated messages in various ways posted by one user might not be modified or edited by another user in communication, which are only totally copied to another application or program for editing. Thus, these information or messages can not be collaborative among the users in communication.

For example, a present service provider can create and launch the service product of a forum for a specific purpose. One of the most popular and general market approaches to attract people is to introduce users to join the forum by sending invitations to those users. Any one of the invited users may probably view some contents or join some general activities of the forum. However, any user who would like to further interact with the forum needs to join the forum with his/her present account or launching a new account in the service provider, and then view or access the further content on the forum by logging in with his/her account.

Another example, a service provider provides a specific application of con-call function on its platform to attract people, like Skype®, each one would like to utilize the con-call service and further attend a specific con-call taking place on the platform needs to use the registered account provided by the service provider and attend the specific con-call by logging in the platform of providing the specific application of con-call function.

Next, like Google® Talk, a user of Google® Talk can send a discussion invitation by his/her e-mail provided by Google® to other people, any one can receive the invitation through his/her current e-mail even though that his/her current e-mail is not provided by Google®. However, he/she can not join the activity of Google® Talk associated with the invitation without the e-mail provided by Google®. Moreover, like Facebook®, the platform provider provides various activities for its members, and the members may share or view their daily status or activities with their friends. However, any user can not view or access his/her friends' status on Facebook®, if he/she does not have an account registered under Facebook®. Accordingly, the user has no choice but registers his/her account provided by those service providers, which may result in the loading on the account management for the user.

Furthermore, like Dropbox®, one user can open a share folder under Dropbox® platform to share, download or upload his/her photos. Though the share folder can be shared to other people, however, other people are not able to interact, communicate or collaborate in the share folder. That is, the share folder can not be cooperatively implemented by the user and other people. Another example, one user may expose himself/herself by posting his/her photo, video work of arts in his/her folder provided by the service provider on Instagram®, or updating his/her resume for business or career on LinkedIn®. However, similar to other platforms, a registered account is necessary for the user to access the contents on such platforms.

Accordingly, to the extent that different activities and services are provided by these different service providers, it means these activities and services are independent or isolated for one another, and can not be cross-linked by the users or any service providers. The users lack suitable approaches to integrate their various assets distributed among the different service providers, as well as establish or extend their social network.

For the service providers, they would like to develop various forums, activities or applications with specific or integrated functions for their markets. However, it will be foreseen for the service providers to provide too much forums, activities or applications with similar functions to attract people.

SUMMARY

Accordingly, a method for establishing a social network and the storage medium thereof are provided by utilizing a deliverable work system to link users who may be individual or a member of different social network. People may associate with the deliverable work system and then deliver the deliverable work system among different users to establish their social network.

Accordingly, a method for extending a social network and the storage medium thereof are provided by providing home systems for the users to host and manage a deliverable work system. The user associated with the deliverable work system and owning the home system may access the deliverable work system by any network-connecting approaches.

Accordingly, a method for extending a social network and the storage medium thereof are provided by creating the deliverable work system for a user. The deliverable work system enables the user creates and prepares it by freely combining various matterizers or tools for the deliverable work system in a home system owned by the user.

Accordingly, a method for extending a social network includes: preparing a deliverable work system in a first home system owned by an associated first user; delivering the deliverable work system to at least one second user to associate the deliverable work system with the at least one second user, wherein the delivering step is repeatable by a plurality of the second users to establish a direct-link relationship of the deliverable work system and each of the second user; and wherein based on a plurality of the direct-link relationship, a plurality of the associated second users and the associated first user are capable to work together in the deliverable work system.

Preferably, the method for extending a social network further comprises establishing at least one second home system to host and manage the deliverable work system for the second user.

Preferably, the second home system is established after the deliverable work system is associated with the second user.

Preferably, the method for extending a social network further comprises acquiring the deliverable work system through a URI (Uniform Resource Identifier) and using a projector to project the deliverable work system.

Preferably, the method for extending a social network further comprises acquiring a projector, loading the projector into an engine, and using the projector to project the deliverable work system, wherein the engine provides a compatible environment for executing the projector.

Preferably, the associated first user and each of the associated second users are associated to the deliverable work system with the direct-link relationship, and the associated first and second users are able to interact, communicate and collaborate in the deliverable work system.

Preferably, the method for extending a social network further comprises acquiring a projector, loading the projector into an engine, and using the projector to project the deliverable work system, wherein the engine provides a compatible environment for executing the projector.

Preferably, the deliverable work system and the projector are acquired through a URI from the associated first user in the delivering step.

Preferably, the engine comprises at least a JavaScript engine, a Windows application, or a Linux application.

Preferably, the projector is loaded from a remote data station or a preinstalled application.

Preferably, the deliverable work system is a reflection of a work related to personal relationships, and the associated first user and the associated second user are able to collaborate, exchange information, have business intercourse or propagate in the deliverable work system.

Preferably, the associated first user and each of the associated second users are associated to the deliverable work system with the direct-link relationship, and the associated first and second users are able to interact, communicate and/or collaborate in the deliverable work system.

Preferably, at least one second home system is owned by the associated second user to host and manage the deliverable work system.

Preferably, the deliverable work system is built by a projectable space instance.

Preferably, the projectable space instance is an object, an XML document, or an instance which is instantiated with structured language or structured protocol.

Accordingly, a method of establishing a social network includes: acquiring a deliverable work system, wherein the deliverable work system is hosted and managed by a first home system; and associating at least one second home system with the deliverable work system, wherein a social network between the first home system and the associated second home system is establishable by the deliverable work system.

Preferably, a method of establishing a social network further comprises projecting the deliverable work system by a projector.

Preferably, the associating step comprises using the projector preset in the second home system to project the deliverable work system, or establishing the second home system to host and manage the associated deliverable work system and the projector after the deliverable work system is projected.

Preferably, the deliverable work system or further together with the projector is acquired through a URI.

Preferably, the first home system and the second home system are same or different, and the deliverable work system is capable of providing the functions of interaction, communication and/or collaboration in the first home system or the associated second home system.

Preferably, plural the second home systems are capable of being linked by the deliverable work system.

Preferably, the deliverable work system is built by a projectable space instance.

Preferably, the projectable space instance is an object, an XML document, or an instance which is instantiated with structured language or structured protocol.

Accordingly, a method for extending a social network comprises: creating a deliverable work system in a first home system owned by an associated first user, wherein the deliverable work system and the function of the deliverable work system are configured to be freely combinative in the first home system by the associated first user; and delivering the deliverable work system to a plurality of second users to associate the deliverable work system with the at least one second user, wherein each of the associated second users has a direct-link relationship with the deliverable work system to extend a social network on Internet.

Preferably, the deliverable work system is configured to be plugged a matterizer, a unified information unit or a unified tool by the associated first user.

Preferably, the associated first user and the associated second users are capable of interacting, communicating, and/or collaborating in the deliverable work system.

Preferably, the deliverable work system is built by a projectable space instance.

Preferably, the projectable space instance is an object, an XML document, or an instance which is instantiated with structured language or structured protocol.

Accordingly, a non-transitory storage medium having instructions for use in execution of the method for extending a social network is provided, wherein the non-transitory storage medium is capable of being connected to the internet.

Accordingly, a non-transitory storage medium having instructions for directing a network-connecting unit to execute the method of establishing a social network, wherein the network-connecting unit is equipped with a program, an engine, or a microkernel.

Accordingly, an individual user and/or members that belong to different social networks may utilize the deliverable work system in the present invention to connect each another, and himself/herself or themselves may have connection with the deliverable work system. Moreover, the individual user and/or the members may build his/her or their respective social network by delivering the deliverable work system to other individual one or ones. The present invention further provides the users with the home system to host and manage the deliverable work system/systems, and the users may freely combine various matterizers or tools into the deliverable work system/systems in their own home system.

BRIEF DESCRIPTION OF THE DRAWINGS

FIG. 10 is a schematic diagram illustrating an exemplary space instance of work system in accordance with the present invention.

FIG. 11 is a schematic diagram illustrating an exemplary interface of the deliverable work system after projection in accordance with the present invention.

DETAILED DESCRIPTION

The present invention is more fully appreciated by reference to the following description, including the following glossary of terms and the concluding examples. For the sake of brevity, the disclosures of the publications, including patents, cited in this specification are herein incorporated by reference.

The examples below are non-limiting and are merely representative of various aspects and features of the present invention. The term "information source" used herein is defined as a sequence of symbols that can be interpreted as a message in the most limited technical meaning. And the message is used for organizing and labeling information. For example, the information source includes website (such as internet service), intranet, social network, software, electronic book, database and other media of information (such as storage media of non-transitory computer or storage media of mobile device). The term "original information" used herein is a file, a web page, a database row, a policy, a rule or any data accessible in corresponding machines and servers, but is not limited thereto. The term "original tool" used herein is a utility, a widget, an intelligent agent, an application, a service or any executable component accessible in corresponding machines and servers, but is not limited thereto. It is noted that the information sources, the original information and the original tool are not restricted to the above examples.

Moreover, "original information" and "original tool" are implementation examples of "original matters" used herein. In accordance with the present invention, a plurality of "original matters" from identical or different "information sources" are modeled to a plurality of "unified matters" by a unifying method. Consequently, the "unified matters" in the same execution environment are compatible with each other and cooperate to perform a specified task. The "unified tool" and the "unified information unit" are implementation examples of the "unified matters". Moreover, the term "Matterizer" used herein is a means, a device or a program code to perform the unifying process.

In an embodiment, the above unifying method comprises steps of: modeling at least one original information obtained from at least one information source of multiple information sources into a unified information unit with one unified data model via re-organizing the original information, and/or modeling at least one original tool obtained from at least one information source of multiple information sources into a unified tool with another unified data model via re-organizing the original tool. The one unified data model and another unified data model could be identical or different, and the unifying method described above could be completed through a matterizer.

Figure 1:
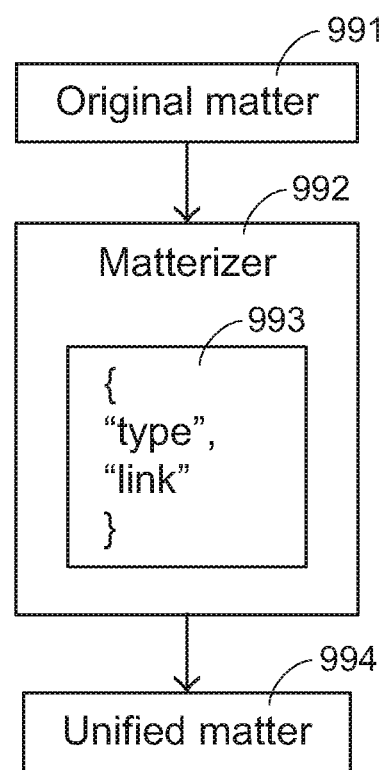
FIG. 1 is a schematic diagram showing an implementation of a unifying method according to an embodiment of the present invention.

Please refer to FIG. 1. FIG. 1 is a schematic diagram illustrating an implementation concept of a unifying method according to an embodiment. As shown in FIG. 1, the matterizer 992 re-organizes an attribute and a link of an original matter 991 with a unified data model 993, and thus models the original matter 991 into a unified matter 994. Consequently, the basic attribute of the unified matter 994 include a type of the original matter 994 and a link indicating where the original matter 994 is located.

In this embodiment, the original matter 991 at least includes an original information (not shown) or an original tool (not shown), but is not limited thereto. In the above unifying method, if the attribute accessible from the original information corresponds to the attribute to be unified in the unified information unit, the unified information unit is directly produced through the matterizer 992. If the attribute accessible from the original information does not correspond to the attribute to be unified in the unified information unit, the original information is firstly re-defined by logically re-organizing the attributes and the link of the original information, and then the original information is converted into a new original information with the attributes which correspond to attributes to be unified in the unified information unit. Consequently, the unified information unit is indirectly produced.

Moreover, if the original tool is compatible with the working environment of the workspace, the unified tool is directly produced by the matterizer 992. On the other hand, if the original tool is incompatible with the working environment of the workspace, the unified tool is indirectly produced via an adapter and/or a software development kit (SDK) of the original tool to drive the original tool. The adapter provides an interface implementation compatible with the working environment.

Herein, "the descriptions of the unifying method", "the methods of obtaining the unified matters" and "the descriptions of the matterizer" may be referred to the U.S. patent application Ser. No. 14/324,069, entitled "A method of unifying information and tool from a plurality of information sources", and also referred to the China Patent Application No. 201410768564.X, which claims the benefit of priority to the U.S. patent application Ser. No. 14/324,069 and is entitled "A method of unifying information and tool from a plurality of information sources and computer product and device using the method". The detailed descriptions thereof are omitted.

The above unifying method is presented herein for purpose of illustration and description only. The method of unifying a plurality of original matters from different information sources is not restricted. However, those skilled in the art will readily observe that numerous modifications and alterations may be made while retaining the teachings of the invention.

Hereinafter, two other unifying methods will be illustrated. The first unifying method is applied to a method of unifying the information of Garmin satellite navigation. Through a point-of-interest (POI) function of the Garmin satellite navigation, the method of unifying the information is employed to unify the imported original point information (i.e., an original information) into the corresponding unified point information (i.e., a unified information unit). The second unifying method is applied to a method of unifying the tool of an Android system. The Android system is a Linux-based open source mobile operating system. However, most application programs (i.e., original tools) are written in the Java programming language. Consequently, the application program (i.e., the original tool) written in the Java programming language can be modeled into a unified application program (i.e., the unified tool) compatible with the Android system so as to be executed in the Android system.

Figure 2:
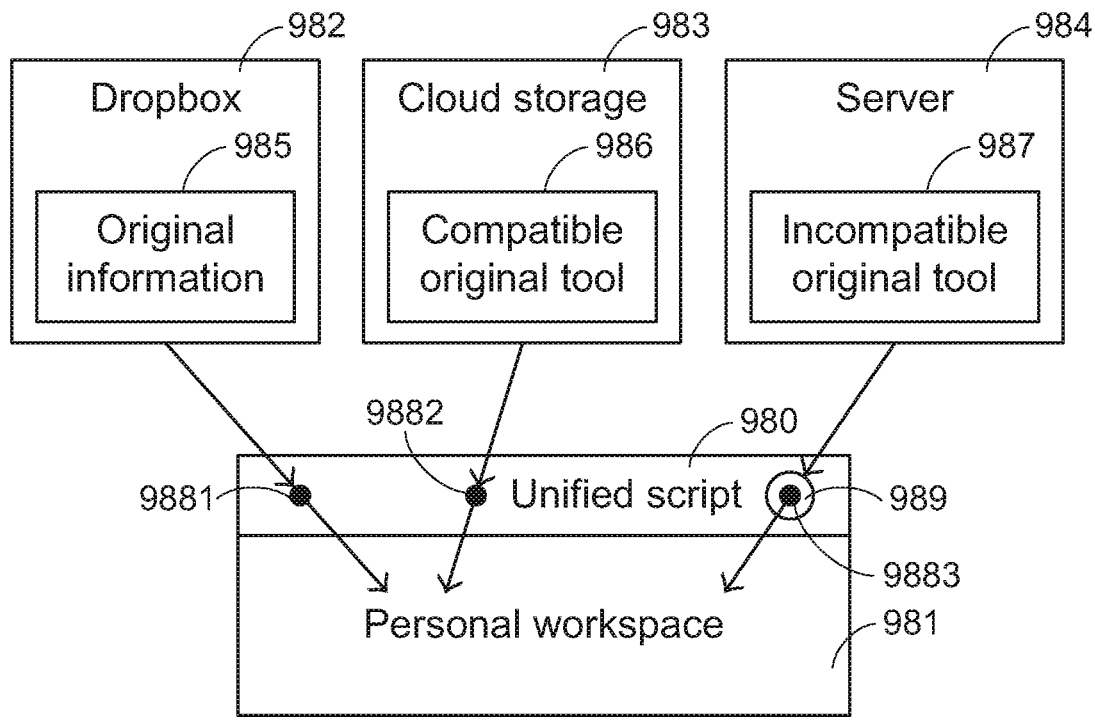
FIG. 2 is a schematic diagram showing an implementation concept of using the unified script as an intermediate language for implementing the personal workspace.

The term "workspace" used herein is a working environment for providing interactions between the at least one matterizer, the at least one tool and/or the at least one information so as to implement a specified task. Moreover, the at least one tool and/or at least one information can be imported into the workspace through the at least one matterizer. However, the way of importing the information and/or tool into the workspace is not restricted. Hereinafter, information importers such as the information importers 9881, 9882 and 9883 of FIG. 2 are some examples of the matterizer. The term "unified script" used herein is an intermediate language to implement the workspace. Moreover, via the "unified script", the at least one matterizer, the at least one tool and/or the at least one information can be provided to the workspace (e.g., built in or plugged in the workspace).

In an embodiment, the above at least one information is a unified information unit which is produced after at least one original information obtained from at least one information source is unified, and the above at least one tool is a unified tool which is produced after at least one original tool obtained from at least one information source is unified. Moreover, according to different tasks, the required unified information unit and/or the required unified tool from the corresponding information source can be added to the personal workspace (e.g., built in or plugged in the personal workspace). In other words, the "workspace" is a user-orientated "personal workspace".

Figure 3:
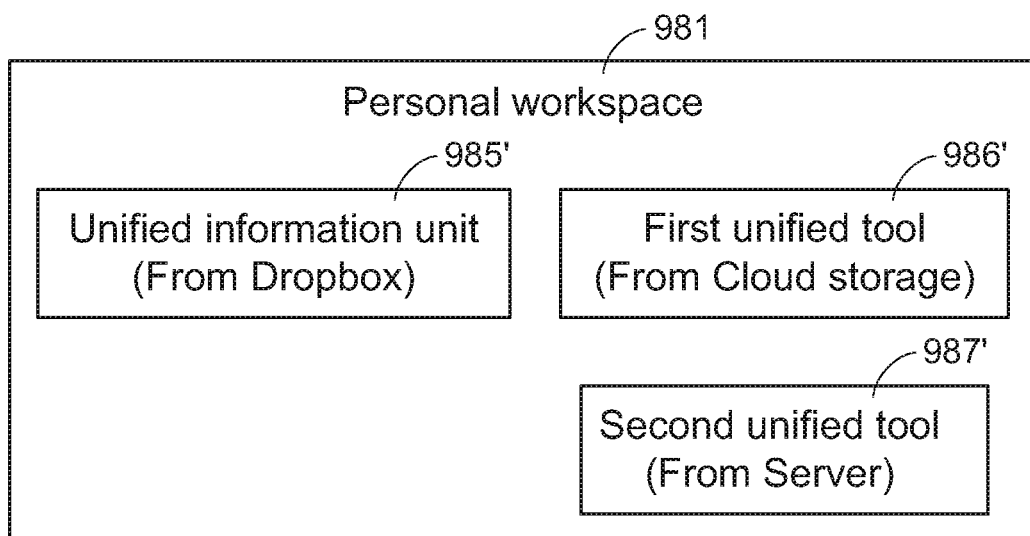
FIG. 3 is a schematic diagram showing a preferred configuration of a personal workspace.

Please refer to FIG. 2 and FIG. 3. FIG. 2 is a schematic diagram illustrating an implementation concept of using the unified script as an intermediate language for implementing the personal workspace. FIG. 3 is a schematic diagram illustrating a preferred configuration of a personal workspace. As shown in FIG. 2 and FIG. 3, a unified information unit 985' corresponding to an original information 985 in Dropbox 982, a first unified tool 986' corresponding to a compatible original tool 986 in a cloud storage 983 and a second unified tool 987' corresponding to an incompatible original tool 987 in a server 984 are combined together into a personal workspace 981 according to the required tasks. In particular, a unified script 980 which is regarded as an intermediate language for implementing the personal workspace 981 is firstly compiled, and then an information importer 9881 of the Dropbox 982, an information importer 9882 of the cloud storage 983 and an information importer 9883 of the server 984 are configured through the unified script 980. Moreover, after the original information 985 in the Dropbox 982 is unified into the unified information unit 985' by the information importer 9881, the unified information unit 985' is imported into the personal workspace 981.

As shown in FIG. 2 and FIG. 3, the original tool stored in the cloud storage 983 is the compatible original tool 986, which is compatible with the component architecture of the unified tool in the personal workspace 981. Moreover, the first unified tool 986' corresponding to the compatible original tool 986 is directly provided to the personal workspace 981 through the information importer 9882 of the unified script 980.

As shown in FIG. 2 and FIG. 3, the original tool stored in the server 984 is the incompatible original tool 987, which is incompatible with the component architecture of the unified tool in the personal workspace 981. Moreover, the second unified tool 987' corresponding to the incompatible original tool 987 is provided to the personal workspace 981 through the compatible adapter 989 and the information importer 9883 of the unified script 980.

As shown in FIG. 3, the user can configure and arrange (e.g., group or place) the unified information unit 985', the first unified tool 986' and the second unified tool 987' in a specific area of the personal workspace 981 according to the practical requirements. Moreover, according to the operational relationship between the unified tool and the unified information unit (e.g., the clicking or dragging actions between the two), the user can perform specified tasks by using the unified tool to access or control the corresponding unified information unit.

Herein, "the descriptions of using the unified script as the intermediate language for implementing the personal workspace" and "the descriptions of allowing the required unified information unit and/or the required unified tool from the corresponding information sources to be arbitrarily combined together into the personal workspace according to the practical requirements" may be referred to the U.S. patent application Ser. No. 14/325,466, entitled "Method for performing task on unified information units in a personal workspace", and also referred to the China Patent Application No. 201410796528.4, which claims the benefit of priority to the U.S. patent application Ser. Nos. 14/324,069 and 14/325,466 and is entitled "A method of combining unified matters in a personal workspace and computer product and device using the method". The detailed descriptions thereof are omitted.

The above personal workspace is presented herein for purpose of illustration and description only. It is noted that the workspace used in the present invention is not restricted. For example, the unified script as the intermediate language for implementing the workspace can be previously edited. Consequently, the workspace equips the default matterizer, the default information and/or the default tool. This workspace is not limited to be operated by a single user. According to the practical requirements, this workspace can be operated by multiple users at the same time or at different times.

Moreover, the "workspace" used herein is obtained by "a method of projecting a workspace" to any electronic device with computational capability. Consequently, the "projected workspace" can be operated by any user through any electronic device with computational capability.

In an embodiment, the method of projecting the workspace comprises the following steps. Firstly, a projectable space instance instantiated by the unified script is obtained through a uniform resource identifier (URI). As mentioned above, the unified script is defined to configure at least one of the matterizer, the information and the tool to model the workspace. Moreover, the projectable space instance is used to build the projected workspace corresponding to the workspace, and thus provide an interface for operating at least one of the matterizer, the information and the tool to implement a task. Then, a projector parses the projectable space instance and build a working environment to configure at least one of the matterizer, the information and the tool so as to execute the projected workspace for providing interactions between at least one user and the projected workspace.

The projector is acquired from a remote data station, the projectable space instance or a preloaded application program, and loaded into an engine for providing a compatible environment to execute the projector. An example of the engine includes but is not limited to a Javascript engine, a Windows application or a Linux application. Preferably but not exclusively, the united script can be declared by a document type definition (DTD), an extensible markup language (XML) schema, a structured language or a structured protocol. Preferably but not exclusively, the projectable space instance is an object, an extensible markup language (XML) document, or an instance instantiated with a structured language or a structured protocol.

Figure 4:
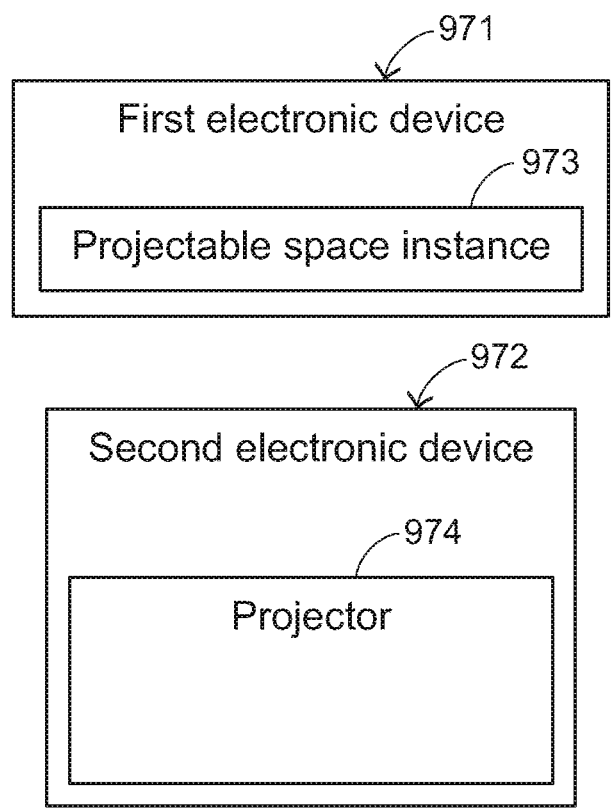
FIG. 4 is a schematic diagram showing an initial state of the method of projecting the workspace according to an embodiment of the present invention.
Figure 5A:
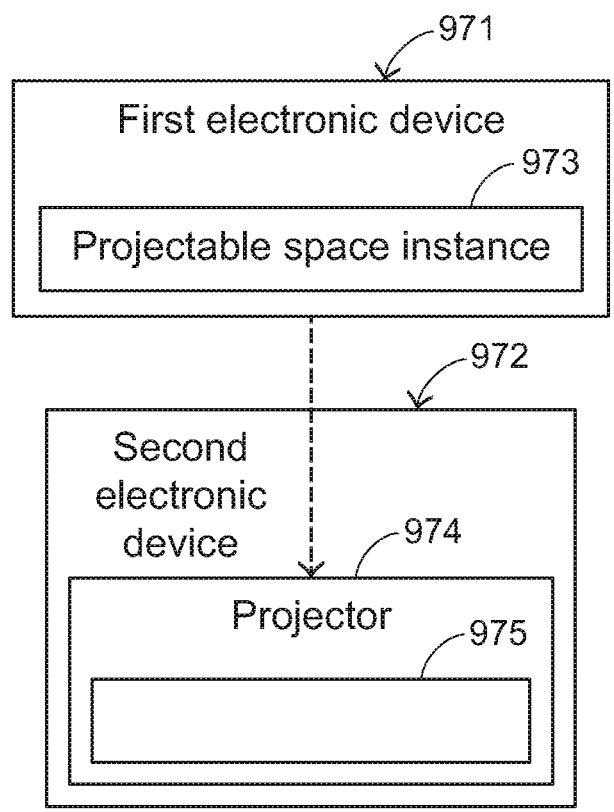
FIG. 5A is a schematic diagram showing operating concepts of the method of projecting the workspace as shown in FIG. 4.
Figure 5B:
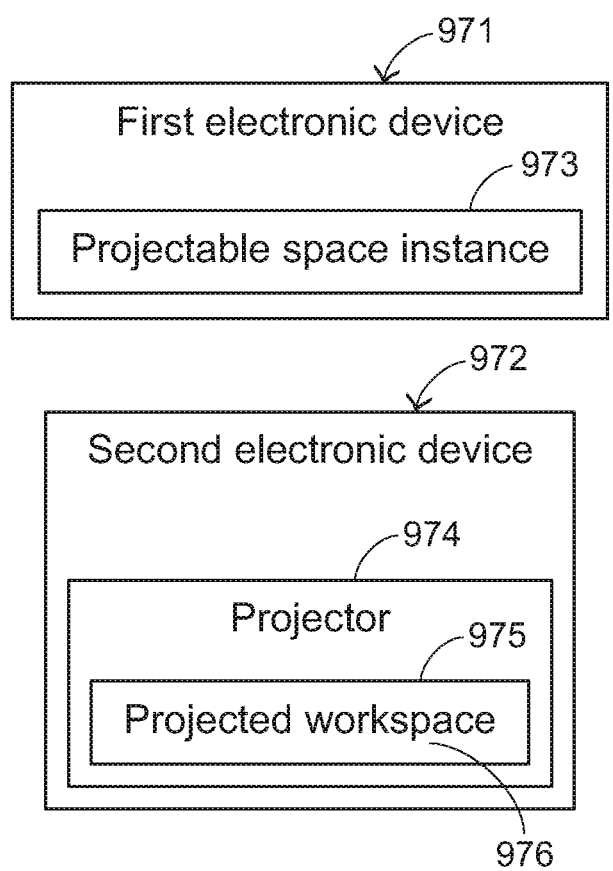
FIG. 5B is a schematic diagram showing operating concepts of the method of projecting the workspace as shown in FIG. 4.
Figure 6:
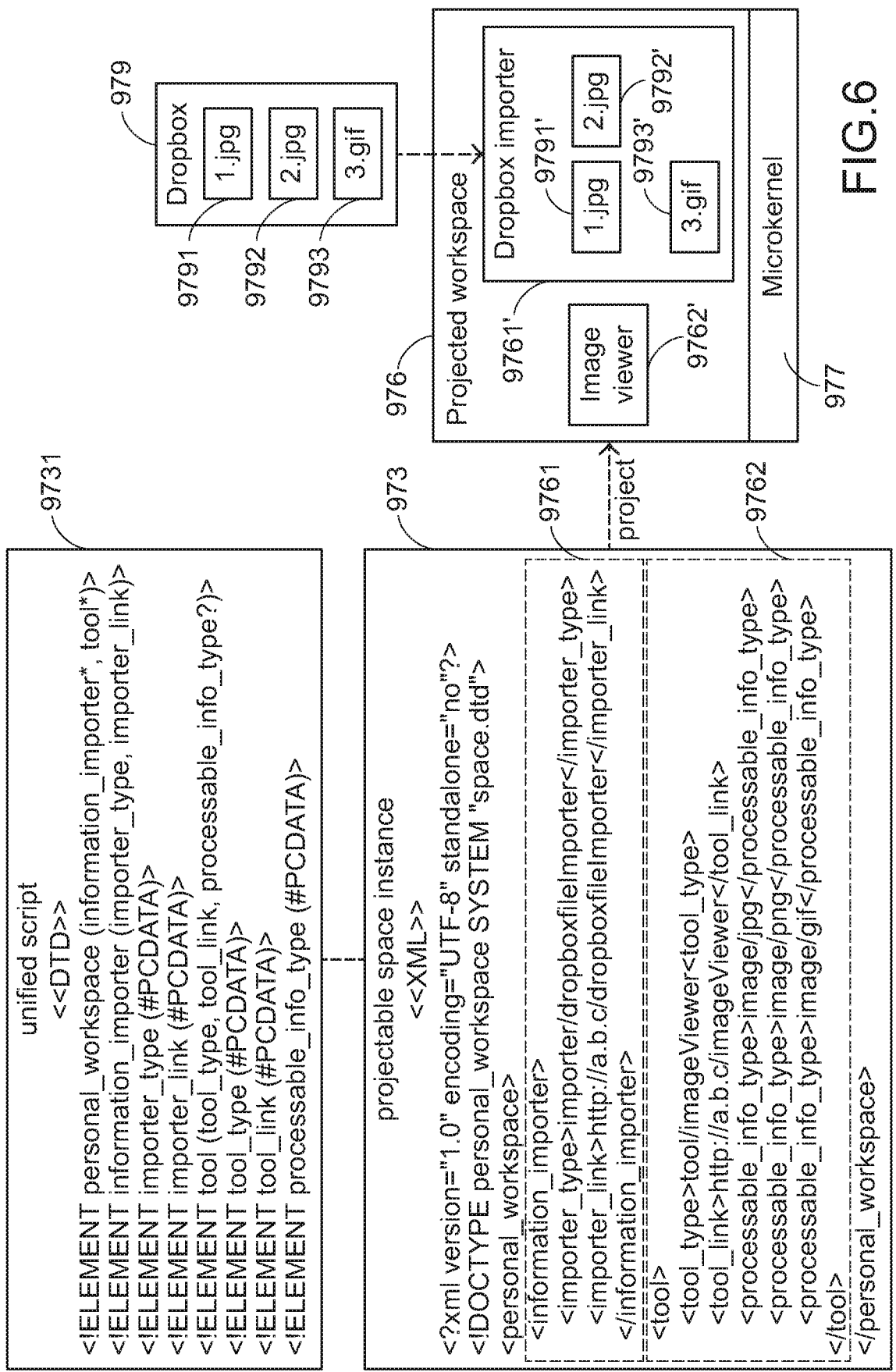
FIG. 6 is a schematic diagram showing the relationship between a projectable space instance as shown in FIG. 4 and a projected workspace as shown in FIG. 5B.

Please refer to FIG. 4, FIG. 5A, FIG. 5B and FIG. 6. FIG. 4 is a schematic diagram illustrating an initial state of the method of projecting the workspace according to an embodiment of the present invention. FIGS. 5A and 5B are schematic diagrams illustrating operating concepts of the method of projecting the workspace as shown in FIG. 4. FIG. 6 is a schematic diagram illustrating the relationship between a projectable space instance as shown in FIG. 4 and a projected workspace as shown in FIG. 5B.

In the initial state of FIG. 4, a first electronic device 971 and a second electronic device 972 are in communication with each other (e.g., through network connection). Moreover, the first electronic device 971 stores a projectable space instance 973, and the second electronic device 972 has a built-in projector 974.

In this embodiment, the united script 9731 is declared by a document type definition (DTD) and defined to configure at least one information importer (i.e., an example of the matterizer), at least one unified information unit and/or at least one unified tool to model a workspace, and the projectable space instance 973 is an instance instantiated with the extensible markup language (XML). As shown in FIG. 6, the projectable space instance 973 is used for building a projected workspace 976 corresponding to the workspace. Moreover, the information importer, the unified information and/or the unified tool is allowed to be added to or removed from the projectable space instance 973.

The projector 974 of the second electronic device 972 will build a working environment 975 in the second electronic device 972 for executing the projected workspace 976. In addition, the projector 974 provides a microkernel 977 (see FIG. 6) to the working environment 975 for equipping at least one information importer, at least one unified information and/or at least one unified tool that will be added to the projected workspace 976. When the second electronic device 972 acquires the projectable space instance 973 from the first electronic device 971 through a URI, the projector 974 of the second electronic device 972 starts to parse the projectable space instance 973 (see FIG. 5A). After the projectable space instance 973 is parsed by the projector 974, the projected workspace 976 is built in the working environment 975 according to parsed contents of the projectable space instance 973 (see FIG. 5B). Accordingly, a user of the second electronic device 972 can interact with the projected workspace 976 through the second electronic device 972 so as to perform related tasks.

The relationships between the unified script 9731, the projectable space instance 973 and the projected workspace 976 will be illustrated in more detailed through a usage situation as shown in FIG. 6. The usage situation as shown in FIG. 6 is related to a process of building a projected workspace that is capable of accessing jpg format image files and gif format image files from a specified internet space and allowing the image files to be viewed by a user. In this usage situation, the unified script 9731 is declared by the Document Type Definition (DTD), and the projectable space instance 973 is instantiated with XML.

Moreover, an information importer and a unified tool are added into the projectable space instance 973, and at least one unified information unit corresponding to the original information is imported into the projected workspace 976 through the information importer. In this usage situation, the information importer is a Dropbox importer. The information of the Dropbox importer is disclosed in the dashed line frame 9761 of FIG. 6. The original information includes a jpg format image file 9791, a jpg format image file 9792 and a gif format image file 9793 in Dropbox 979 (i.e., an information source). The unified information units include a unified jpg format image file 9791', a unified jpg format image file 9792' and a unified gif format image file 9793', which will be described later. The unified tool is an image viewer for accessing image files which are imported into the projected workspace 976. The information of the image viewer is disclosed in the dashed line frame 9762 of FIG. 6.

As mentioned above, the projected workspace 976 is built after the projectable space instance 973 is parsed by the projector 974 of the second electronic device 972. In this embodiment, the Dropbox importer 9761' corresponding to the dashed line frame 9761 and the image viewer 9762' corresponding to the dashed line frame 9762 are configured in the projected workspace 976. Moreover, the jpg format image file 9791, the jpg format image file 9792 and the gif format image file 9793 in Dropbox 979 are unified and imported into the projected workspace 976 by the Dropbox importer 9761'. Consequently, the unified jpg format image file 9791' corresponding to the jpg format image file 9791, the unified jpg format image file 9792' corresponding to the jpg format image file 9792 and the unified gif format image file 9793' corresponding to the gif format image file 9793 are displayed on the projected workspace 976. When the user of the second electronic device 972 manipulates any of the unified image files 9791', 9792' and 9793' by any specified operating means (such as an action of clicking any of the unified images files 9791', 9792' and 9793' or an action of dragging and dropping any of the image files 9791', 9792' and 9793' to the image viewer 9762'), the image viewer 9762' will access the contents of the corresponding unified image files 9791', 9792' or 9793' to allow the unified image files 9791', 9792' or 9793' to be viewed by the user. Moreover, the Dropbox importer 9761' and the image viewer 9762' mentioned above are equipped by the microkernel 977.

It is noted that the URI of the projectable space instance 973 may be a HTTP (hypertext transfer protocol) URI or a FTP (file transfer protocol) URI. In case that the first electronic device 971 and the second electronic device 972 are integrated into one device, the URI of the projectable space instance 973 can also be a local file URI. However, the types of the URI of the projectable space instance 973 are not restricted.

Herein, "the descriptions of the method of projecting the workspace" may be referred to the U.S. patent application Ser. No. 14/577,772, entitled "Method of projecting a workspace and system using the same", and also referred to the China Patent Application No. 201410814138.5, which claims the benefit of priority to the U.S. patent application Ser. Nos. 14/324,069, 14/325,466 and 14/577,772 and is entitled "Method of projecting a workspace and system using the same". The detailed descriptions thereof are omitted.

The above method of projecting the workspace to any electronic device with computational capability is presented herein for purpose of illustration and description only. The method of projecting the workspace to any electronic device with computational capability is not restricted. However, those skilled in the art will readily observe that numerous modifications and alterations may be made while retaining the teachings of the invention. Moreover, any workspace can be projected to any electronic device with computational capability. That is, any workspace can be delivered to any electronic device with computational capability.

A "deliverable work system" and a "space instance of the work system" mentioned in the following paragraphs are respectively one example of "workspace" and "projectable space instance" aforementioned. A "work system" mentioned in the following paragraphs of the present invention is mainly to include a group or set of works. The "deliverable work system" executed on a machine after the "space instance of work system" is parsed by a projector can be viewed as a projected workspace corresponding to a workspace. A "home system" in the following paragraphs of the present invention is mainly to manage the work system, but not limited, and it may be configured to extend its functions to manage other subsystem, matterizer, tool or information. Furthermore, the home system may be launched in a suitable platform, such as a browser, a Windows platform or an embedded system launched on a physical hardware.

Figure 7:
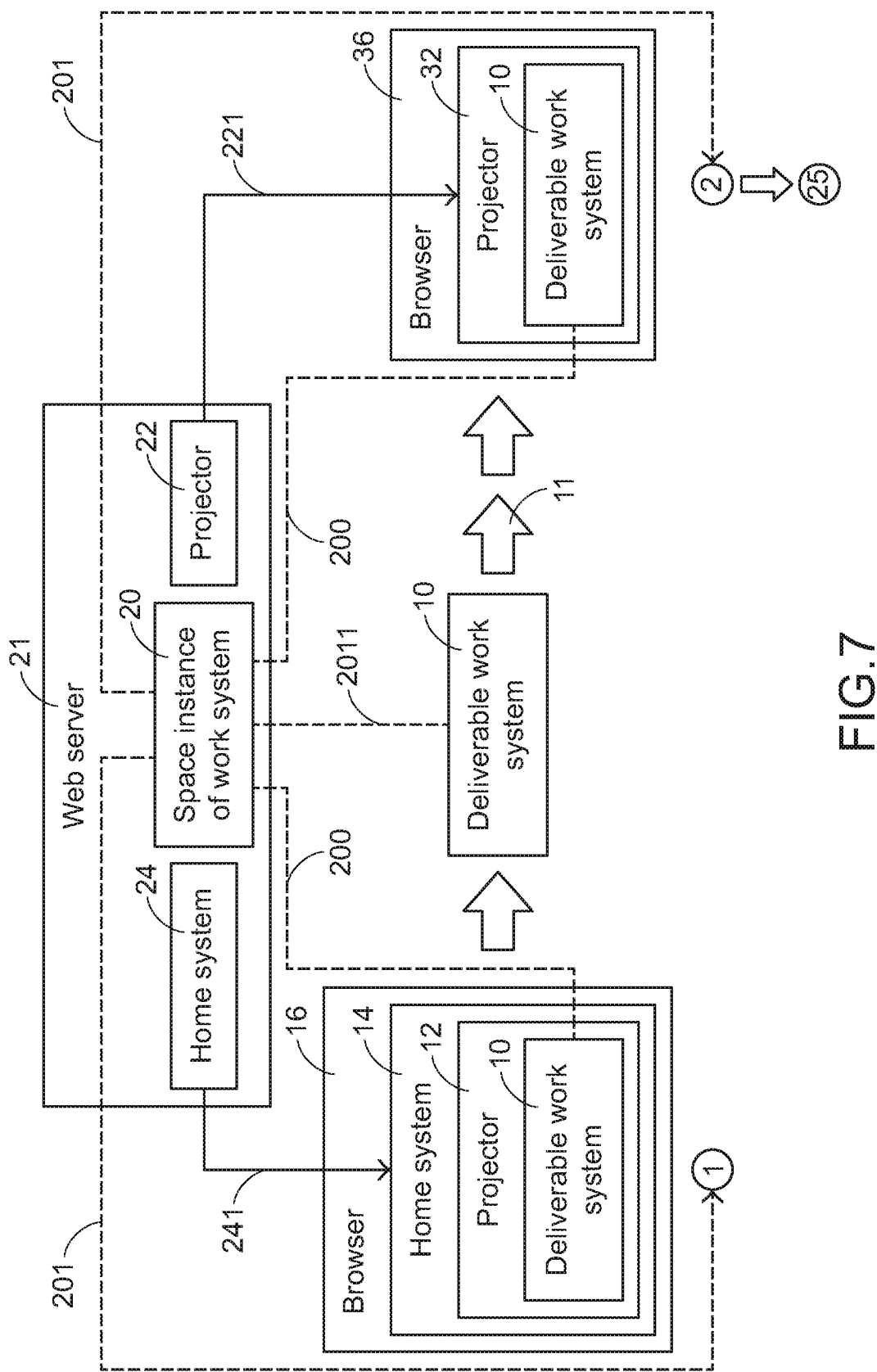
FIG. 7 is a schematic diagram illustrating the block system of establishing social network according to the present invention.

FIG. 7 is a schematic diagram illustrating the block system of establishing social network according to the present invention. A web server 21 at a remote site may be connected to the internet and include a home system 24, a space instance of work system 20 and a projector 22. In a first situation, a user may create, prepare or store the space instance of work system 20 in a suitable way at the web server 21, and be associated with the space instance of work system 20 to be called as an associated first user 1 in the present invention. Thus, a direct-link relationship, representing as a dash line 201 in FIG. 7, is established between the space instance of work system 20 and the associated first user 1, and the account of the associated first user 1 may be recorded in the space instance of work system 20. The space instance of work system 20 may be fetched through a URI (uniform resource identifier) from the web server 21 and build a deliverable work system at a local site, but not limited. Furthermore, the space instance of work system 20 may be an object, an XML document, or an instance which is instantiated with structured language or structured protocol, but not limited. Furthermore, the projector 22 in the web server 21 may be fetched together with the space instance of work system 20 through the same or extendable URI, but not limited.

Next, not limited to, the associated first user 1 may launch and execute a browser 16, which may be installed in a machine or a suitable storage medium (not shown) at the local site, to load and launch his/her first home system 14 from a home system 24 of the web server 21 (a line 241 representing the launching action) and further to execute his/her first home system 14 at his/her local site. The first home system 14 may be or be not equipped with a projector 12. In the case of one without any projector, the projector 12 may be acquired for the first home system 14 by launching the projector 22 from the web server 21. The space instance of work system 20 may be fetched into the first home system 14 and the deliverable work system 10 corresponding to the space instance of work system 20 may be projected by the projector 12 in the first home system 14 after the space instance of work system 20 is parsed by the projector 12 (a line 200 representing the fetching and projection action). In the present invention, it is understood that the projector 12 may provide a microkernel for equipping and fetching at least one matterizer, at least one unified information unit and/or at least one unified tool into the deliverable work system 10.

In a first embodiment, the associated first user 1 owns the first home system 14 and may use the first home system 14 to host and manage the deliverable work system 10. In the first home system 14, the associated first user 1 may further prepare the deliverable work system 10 by freely combining various one or more matterizer, unified tool or unified information unit. That is, the deliverable work system 10 is capable of equipping, importing or adding matterizer, unified information unit or unified tool after projected, too. Alternatively, the associated first user 1 may acquire the deliverable work system 10 which is created and prepared by other users. In this case, the associated first user 1 may access the deliverable work system 10 in his/her first home system 14. Accordingly, the associated first user 1 may utilize his/her owned first home system 14 to host and manage the deliverable work system 10, and further deliver the deliverable work system 10 to other people whom he/she would like to invite.

By utilizing a suitable channel 11, for example but not limited to, an network channel such as Whatsapp®, Line®, Facebook® or Twitter®, or telecom channel like telecommunication or fax, or physical channel like paper note, the deliverable work system 10 in the first home system 14 may be delivered to one or more second users 2 to associate the deliverable work system 10 and the second users 2. It is understood, though the deliverable work system 10 is delivered to only one second user 2 in FIG. 7, however, not limited to, the associated first user 1 may deliver the deliverable work system 10 to plural second users 2 by various channels 11 at the same time or sequentially. Furthermore, a dash line 2011 illustrates that the deliverable work system 10 on the channel 11 may be recognized by the URI of the space instance of work system 20 or other suitable link associated with the space instance of work system 20.

Accordingly, the deliverable work system 10 may be delivered, with or without the project, through a URI (Uniform Resource Identifier), such as HTTP (hypertext transfer protocol) URI or a FTP (file transfer protocol) URI. Once a second user 2 opens the deliverable work system 10, the second user may be associated with the deliverable work system 10 and called as the associated second user 25 in FIG. 7.

Any one of the associated second users 25 may acquire the deliverable work system 10 under the situation with or without a preset projector 32. For example, one of the second users 2 may use a network-connecting unit with a preset browser 36. In the case of the preset browser 36 not equipped with a projector, the associated second user 25 may acquire the deliverable work system 10 and the projector 32 through the URI from the associated first user 1. In this situation, the preset browser 36 of the network-connecting unit may load and launch the projector 32 (represented as a line 221) through the URI of the projector 22 of a remote site, such as the web server 21, and then use the projector 32 to fetch and project the deliverable work system 10 and further associate the deliverable work system 10 and the second user 2. Thus, another direct-link relationship, also representing as a dash line 201 at the second user 2's site in FIG. 7, is established between the space instance of work system 20 and the associated second user 25 (converted from the second user 2).

Alternatively, the second user 2 uses the network-connecting unit equipped with a preinstalled application (not shown), such as a program, an engine or an agent. For example, an engine may include at least a JavaScript engine, a Windows application, or a Linux application. Next, the preinstalled application may provide a compatible environment for executing the projector. In this situation, the projector 32 may be acquired first and then loaded into the preinstalled application, and then the projector 32 fetches and projects the deliverable work system 10 to associate the deliverable work system 10 and the second user 2.

Similar to the delivery action of the associated first user 1, the associated second user 25 may further delivery the deliverable work system 10 by utilizing different channel 11, and such a step may be repeatedly executed among different second users 2 to establish the direct-link relationship between the deliverable work system 10 and each of the associated second user 25. Accordingly, based on the plural direct-link relationships, the associated second users 25 without the second home systems may be related among them through the deliverable work system 10. Furthermore, since the deliverable work system 10 is from the associated first user 1, the associated first user 1 and each of the plural associated second users 25 are associated to the deliverable work system 10 with the direct-link relationships. Thus, a social network among the associated first and second users may be established by the plural direct-link relationships of the deliverable work system 10.

Compared to the first step of registering or logging-in an account provided by a service provider of present social networking site, the deliverable work system of the present invention provides a user to be associated thereto without any home system. Thus it is beneficial for users to reduce the loading of account management on internet. It is also advantageous for service providers to reduce the cost of account management. Though the associated second user 25 may access the deliverable work system 10 without any second home system, however, like the first home system, a second home system may be configured to host and mange the deliverable work system 10. Thus, it is noted that the establishment of the second home system is advantageous for the associated second user 25 to further extend the social network by easily operating the deliverable work system 10 in the second home system. Thus, an exemplary creation of a home system in the present invention will be set forth in the following paragraphs.

Figure 8:
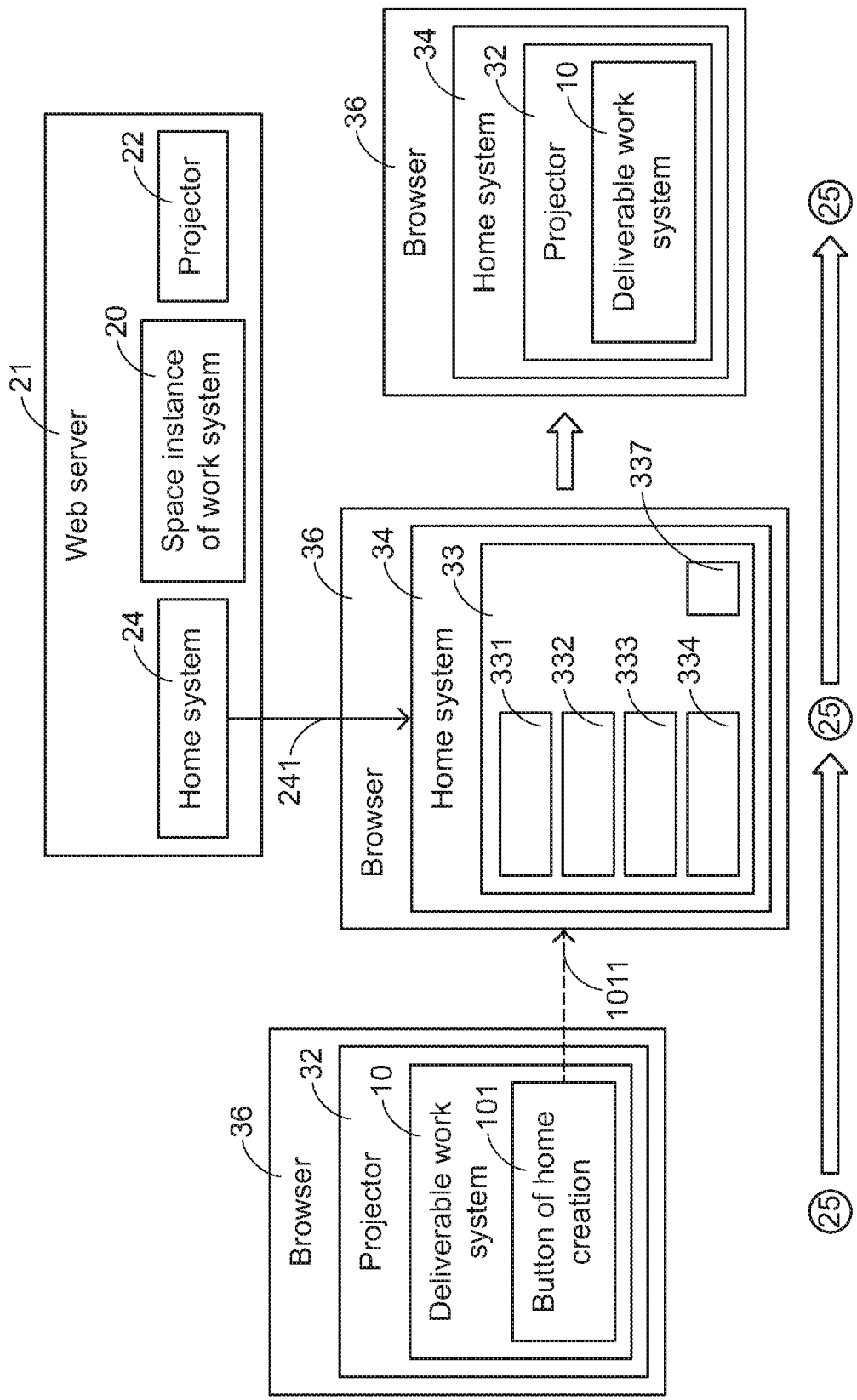
FIG. 8 is a schematic diagram illustrating the creation process of a second home system according to the present invention.

FIG. 8 is a schematic diagram illustrating the creation process of a second home system according to the present invention. Refer to FIG. 8, the associated second user may open the deliverable work system 10 from the associated first user 1, even he/she does not have any account or log in his/her existing account. In this case, a button of home creation 101 may be provided on the interface of the deliverable work system 10 and driven the associated second user 25 to create a home system for him/her. A dash line 1011 represents a path (such as http://www.home.com/createhome/ . . . / work system, but not limited to) including the links of home system and the deliverable work system 10 to be connected by the browser 36 from the web server 21, in response to the commend of the button of home creation 101, such as clicking the button of home creation 101 by the associated second user 25. Next, a registration dialog 33 of a second home system 34 may be loaded and launched (represent as line 241) from the home system 24 of the web server 21, and then projected in the browser 36 at the associated second user 25 site. Generally, a registration dialog 33 may provide several text options or interfaces for the texting of the associated second user 25 in the registration dialog 33. For example, but not limited to, the associated second user 25 may type an account on an item 331 and a password on an item 332 for creating the new second home system 34. The registration dialog 33 may further provide some specific items for some present popular service providers of present social networking sites, which may provide the associated second user 25 other options to log in by selecting his/her familiar account. For example, the associated second user 25 may type his/her Facebook® account on an item 333 or Twitter® account on an item 335. The associated second user 25 may determine his/her account by pushing a button 337 in the registration dialog 33, and then the deliverable work system 10 may be re-opened in the new second home system 34. It is understood that the direct-link relationship between the associated second user 25 and the space instance of work system 20 in the web server 21 is omitted in FIG. 8. However, the direct-link relationship exists during the creation or logging in of the second home system 34.

In the case of creating a new account, the web server 21 may further add the new account corresponding to the associated second user 25 into the space instance of work system 20. Moreover, the home system 24 in the web server 21 records the new account for the associated second user 25 and the deliverable work system 10 in the new account. In the case of using his/her existing account, the web server 21 records the existing account for the associated second user 25 in the space instance of work system 20.

Figure 9:
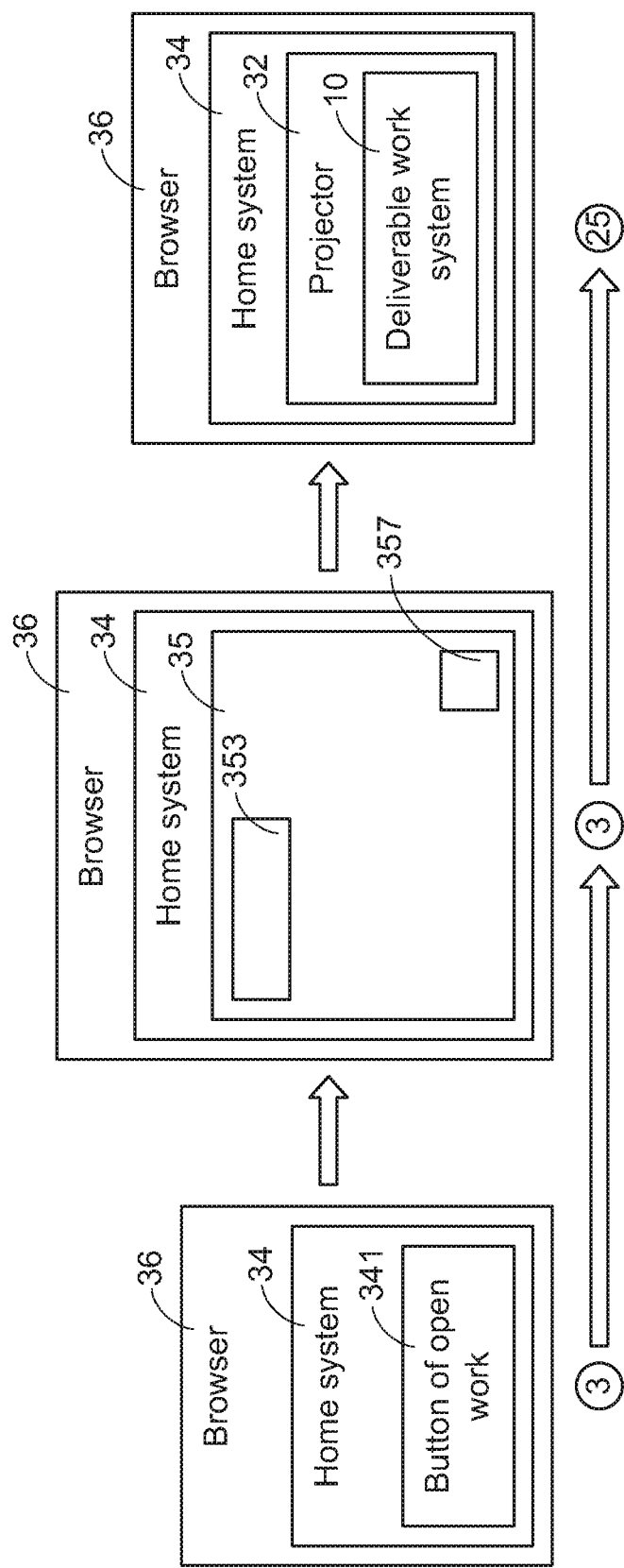
FIG. 9 is a schematic diagram illustrating the process of opening the deliverable work system in an existing or preset home system at the user's site in accordance with the present invention.

FIG. 9 is a schematic diagram illustrating the process of opening the deliverable work system in an existing or preset home system at the user's site in accordance with the present invention. Refer to FIG. 9, beginning from the left block, the browser 36 and the second home system 34 have executed at the site of a second user 3 with his/her existing account. In the present invention, when the associated first user 1 (shown in FIG. 7) delivers the deliverable work system 10 to the second user 3, a button of open work 341 may be pop out or shown on the interface of the second home system 34. The second user 3 may operate the button of open work 341 to open a dialog 35 in the second home system 34, referring to the middle block in FIG. 9. The exemplary dialog 35, but not limited to, may provide an item 353 for inputting or pasting the URI corresponding to the deliverable work system 10. The dialog 35 may further include a button 357 for the second user 3 to confirm the text input or pasted in the item 353. Optionally, not limited to, the URI of the deliverable work system 10 may be default pasted in the item 353 to wait for the confirmation of the second user 3. Further referring to the right block in FIG. 9, the deliverable work system 10 will be opened in the second home system 34, in response to the second user 3's comment by pushing the button 357, and the second user 3 is associated to the deliverable work system 10 to become the associated second user 25. It may be noted that the projector 32, together with the deliverable work system 10, may be launched into the second home system 34 if necessary.

FIG. 10 is a schematic diagram illustrating an exemplary space instance of work system in accordance with the present invention, and FIG. 11 is a schematic diagram illustrating an exemplary interface of the deliverable work system after projection in accordance with the present invention. Referring to FIG. 7, FIG. 10 and FIG. 11, an exemplary space instance of work system 20 may be a XML (eXtensible Markup Language) document 23 of the deliverable work system 10, but not limited. For one of the typically deliverable work system 10, each of users associated to the deliverable work system may be listed as a text 231, a text 233 or a text 235 on the XML document 23 to establish the direct-link relationship between the deliverable work system 10 and each of the associated users. For an exemplary interface 13 of the deliverable work system 10, the users 131, 133, and 135 are corresponding to the texts 231, 233, and 235 on the XML document 23 to be projected on the interface 13. Any user to be associated to the deliverable work system 10 may be written into the XML document 23 in sequence or simultaneously to update the XML document 23. Each of the associated users may view other associated users though the interface 13 of the deliverable work system 10, so as to further interact among them though the interface 13 of the deliverable work system 10.

Continuously referring to FIG. 7, FIG. 10 and FIG. 11, various unified tools may be imported through the XML document 23, such as text 232 representing the communication tool of Messenger, text 234 being the tool of Dialer, and text 236 corresponding to the tool of Collector. Since the deliverable work system 10 of the present invention provides one associated user the various tools, each of the associated users may select one suitable tool, shown as items 132, 134, and 136 in FIG. 11, to communicate with other associated users on the deliverable work system 10. For example, if one of the associated user would like to communicate with the user 131 through dialer, he/she may drag the user 131 and drop the user 131 into the item 134 on the interface 13 of the deliverable work system 10, so as to communicate through the dialer and collaborate by inputting any information in the item 134 on the deliverable work system 10. Accordingly, one associated user without or with a home system different from other associated user is capable of communicating with the other associated user on the deliverable work system. It is beneficial for users not to register a new account just for a or few specific purposes, but establish or extend his/her social network thought the direct-link relationship of the deliverable work system 10.

Figure 12:
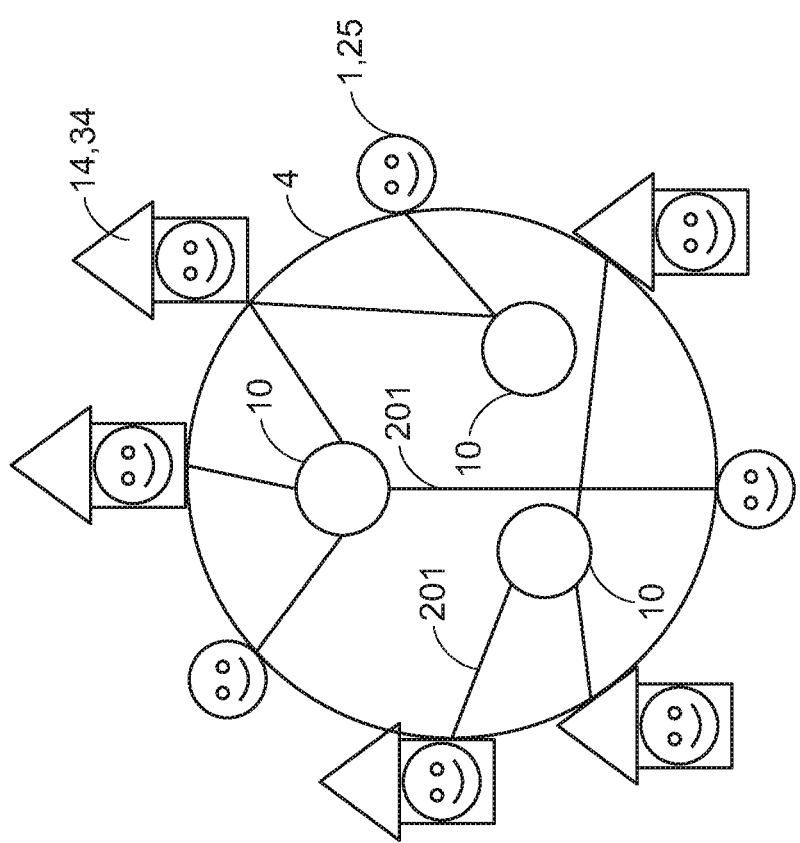
FIG. 12 is a schematic diagram illustrating the social network among home systems or users through the deliverable work systems in accordance with the present invention.

FIG. 12 is a schematic diagram illustrating the social network among home systems or users through the deliverable work systems in accordance with the present invention. Referring to FIG. 12, a social network 4 is established to have plural deliverable work systems 10 as the cores of the social network 4. Each of the deliverable work system 10 may have a direct-link relationship with each of associated user 1 or 25. Anyone of the associated users may own his/her home system 14 or 34 to host and manage the deliverable work system 10. The associated first user 1 and second user 25 are associated to the deliverable work system 10 with the direct-link relationship (line 201).

Accordingly, the present invention provides a method for establishing a social network, which may be stored in a non-transitory storage medium to have instructions for use in execution or direct a network-connecting unit to execute. One exemplary network-connecting unit is equipped with a program, an engine, or a microkernel for executing the method. A deliverable work system is utilized to link users who may be individual or a member of different social network. People may associate with the deliverable work system and then deliver the deliverable work system among different users to establish their social network, and further own their home systems to host and manage a deliverable work system.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for extending a social network, comprising:
preparing a deliverable work system in a first home system owned by an associated first user;
delivering the deliverable work system to at least one second user to associate the deliverable work system with the at least one second user, wherein the delivering step is repeatable by a plurality of the second users to establish a direct-link relationship of the deliverable work system and each of the second user; and wherein based on a plurality of the direct-link relationship, a plurality of the associated second users and the associated first user are capable to work together in the deliverable work system, wherein the deliverable work system is built by a projectable space instance after the projectable space instance is parsed, the deliverable work system being built according to parsed contents of the projectable space instances;
establishing at least one second home system to host and manage the deliverable work system for the second user; and
acquiring a projector, loading the projector into an engine, and using the projector to project the deliverable work system, wherein the engine provides a compatible environment for executing the projector.

2. The method for extending a social network according to claim 1, wherein the second home system is established after the deliverable work system is associated with the second user.

3. The method for extending a social network according to claim 2, further comprising acquiring the deliverable work system through a URI (Uniform Resource Identifier) and using a projector to project the deliverable work system.

4. The method for extending a social network according to claim 1, wherein the associated first user and each of the associated second users are associated to the deliverable work system with the direct-link relationship, and the associated first and second users are able to interact, communicate and collaborate in the deliverable work system.

5. The method for extending a social network according to claim 1, further comprising acquiring a projector, loading the projector into an engine, and using the projector to project the deliverable work system, wherein the engine provides a compatible environment for executing the projector.

6. The method for extending a social network according to claim 5, wherein the deliverable work system and the projector are acquired through a URI from the associated first user in the delivering step; or
the engine comprises at least a JavaScript engine, a Windows application, or a Linux application; or
the projector is loaded from a remote data station or a preinstalled application; or
the deliverable work system is a reflection of a work related to personal relationships, and the associated first user and the associated second user are able to collaborate, exchange information, have business intercourse or propagate in the deliverable work system.

7. The method for extending a social network according to claim 1, wherein the associated first user and each of the associated second users are associated to the deliverable work system with the direct-link relationship, and the associated first and second users are able to interact, communicate and/or collaborate in the deliverable work system.

8. The method for extending a social network according to claim 7, wherein at least one second home system is owned by the associated second user to host and manage the deliverable work system.

9. The method for extending a social network according to claim 1, wherein the projectable space instance is an object, an XML document, or an instance which is instantiated with structured language or structured protocol.

10. A non-transitory storage medium having instructions for use in execution of the method of claim 1, wherein the non-transitory storage medium is capable of being connected to the internet.

11. A method for establishing a social network, comprising:
acquiring a deliverable work system, wherein the deliverable work system is hosted and managed by a first home system;
associating at least one second home system with the deliverable work system, wherein a social network between the first home system and the associated second home system is establishable by the deliverable work system, wherein the deliverable work system is built by a projectable space instance after the projectable space instance is parsed, the deliverable work system being built according to parsed contents of the projectable space instance; and
acquiring a projector, loading the projector into an engine, and using the projector to project the deliverable work system, wherein the engine provides a compatible environment for executing the projector.

12. The method for establishing a social network according to claim 11, further comprising projecting the deliverable work system by a projector.

13. The method for establishing a social network according to claim 12, wherein the associating step comprises using the projector preset in the second home system to project the deliverable work system, or establishing the second home system to host and manage the associated deliverable work system and the projector after the deliverable work system is projected; or
the deliverable work system or further together with the projector is acquired through a URI.

14. The method for establishing a social network according to claim 11, wherein the first home system and the second home system are same or different, and the deliverable work system is capable of providing the functions of interaction, communication and/or collaboration in the first home system or the associated second home system; or
a plurality of the second home systems are capable of being linked by the deliverable work system; or
the projectable space instance is an object, an XML document, or an instance which is instantiated with structured language or structured protocol.

15. A non-transitory storage medium having instructions for directing a network-connecting unit to execute the method of claim 11, wherein the network connecting unit is equipped with a program, an engine, or a microkernel.

16. A method for extending a social network, comprising:
creating a deliverable work system in a first home system owned by an associated first user, wherein the deliverable work system and the function of the deliverable work system are configured to be freely combinative in the first home system by the associated first user;
delivering the deliverable work system to a plurality of second users to associate the deliverable work system with the at least one second user, wherein each of the associated second users has a direct-link relationship with the deliverable work system to extend a social network on Internet, wherein the deliverable work system is built by a projectable space instance after the projectable space instance is parsed, the deliverable work system being built according to parsed contents of the projectable space instances;
establishing at least one second home system to host and manage the deliverable work system for the second user; and
acquiring a projector, loading the projector into an engine, and using the projector to project the deliverable work system, wherein the engine provides a compatible environment for executing the projector.

17. The method for extending a social network according to claim 16, wherein the deliverable work system is configured to be plugged a matterizer, a unified information unit, or a unified tool by the associated first user; or
the associated first user and the associated second users are capable of interacting, communicating, and/or collaborating in the deliverable work system.

* * * * *

UNITED STATES PATENT AND TRADEMARK OFFICE
CERTIFICATE OF CORRECTION

| | | |
|---|---|---|
| PATENT NO. | : 11,550,551 B2 | |
| APPLICATION NO. | : 15/319066 | |
| DATED | : January 10, 2023 | |
| INVENTOR(S) | : Wai-Tung Cheung et al. | |

It is certified that error appears in the above-identified patent and that said Letters Patent is hereby corrected as shown below:

In the Claims

In Claim 1, Column 16, Line 48, delete "instances;" and insert -- instance; --.

In Claim 16, Column 18, Line 42, delete "instances;" and insert -- instance; --.

Signed and Sealed this
Twenty-eighth Day of February, 2023

Katherine Kelly Vidal
*Director of the United States Patent and Trademark Office*